April 26, 1949.  E. LABIN ET AL  2,468,083

RADIO LOCATING AND COMMUNICATING SYSTEM

Filed Jan. 8, 1944  3 Sheets-Sheet 1

INVENTORS
EMILE LABIN
DONALD D. GRIEG
ARNOLD M. LEVINE
BY Percy P. Lantzy
ATTORNEY

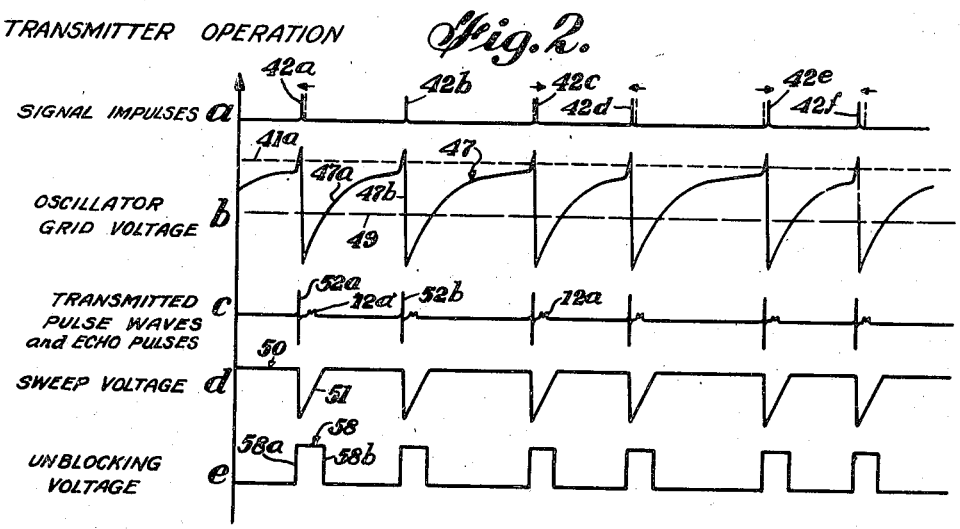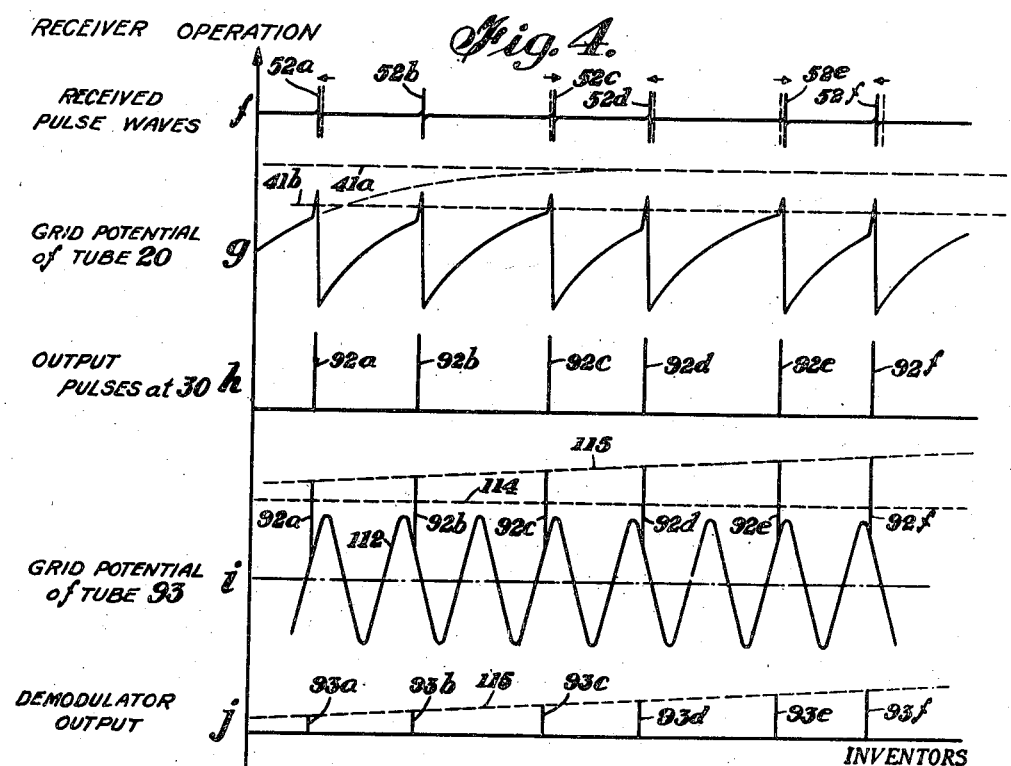

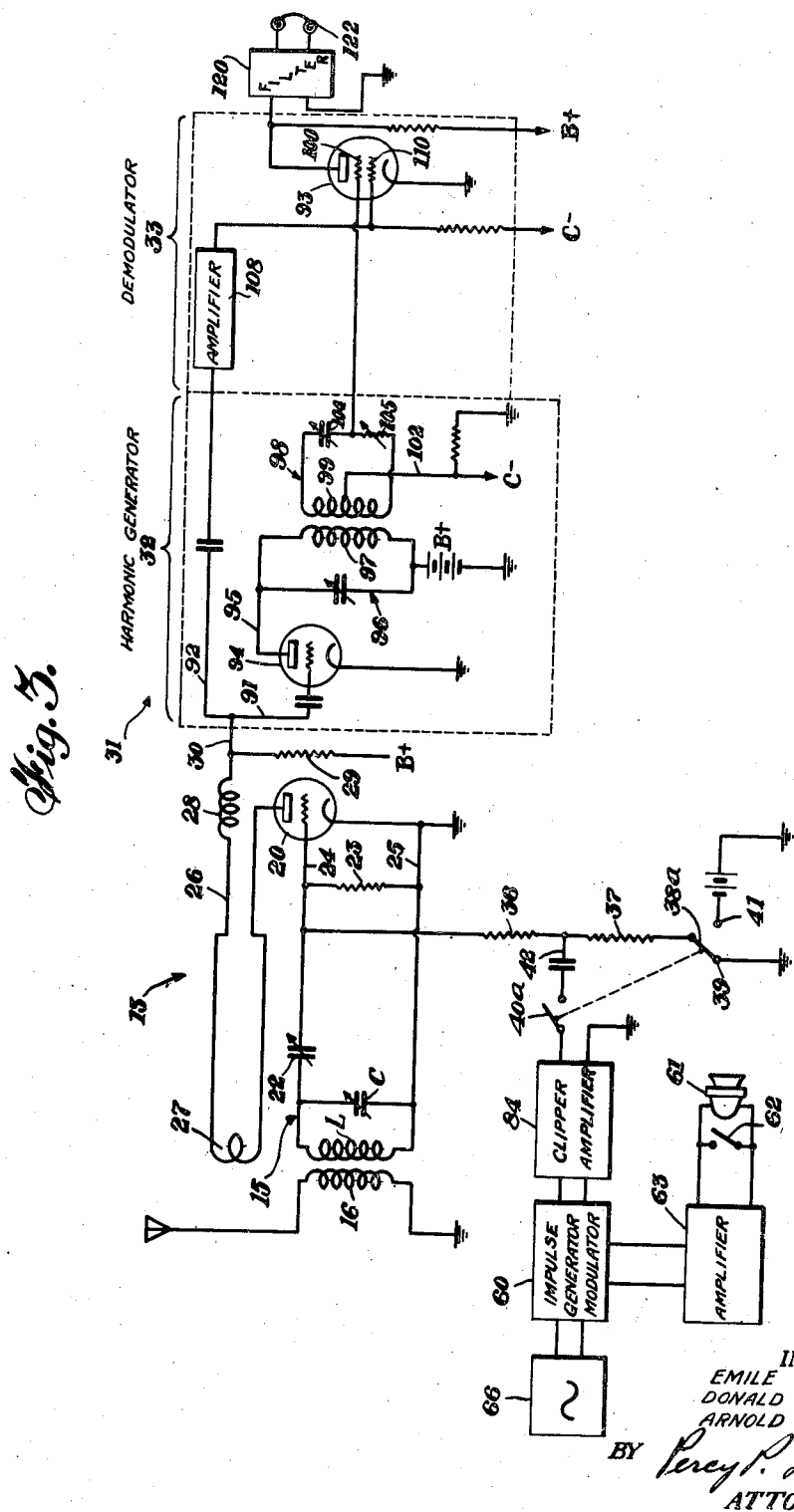

UNITED STATES PATENT OFFICE 2,468,083

RADIO LOCATING AND COMMUNICATING SYSTEM

Emile Labin, New York, and Donald D. Grieg and Arnold M. Levine, Forest Hills, N. Y., assignors to Federal Telephone and Radio Corporation, New York, N. Y., a corporation of Delaware Application January 8, 1944, Serial No. 517,478

5 Claims. (Cl. 343—13)

This invention relates to radio locating systems for determining the direction and range of obstacles such as aircraft and ships and more particularly to a system of this character by which communication may be had with other stations and/or the occupants of friendly craft.

In our copending application, Serial No. 509,230, filed November 6, 1943, entitled "Radio locating and signalling systems" we disclose a system capable of detecting the approach or presence of aircraft and ships and to simultaneously signal modulate the transmission of radio pulses or waves used for obstacle detection purposes by varying the pulse repetition frequency or rate according to intelligence to be transmitted. This enables the operator of a radio locating system to inquire whether or not a detected craft is friendly and also to warn other stations of the approach of such craft. Should the craft be friendly it will be provided with proper equipment to detect the message and for making replies. The method of signal modulation disclosed in the aforesaid application includes frequency modulation of the pulse repetition rate and telegraph keying of the pulses between two given repetition rates.

It is one of the objects of this invention to provide a further method and means for detecting craft and for signalling other stations and/or the occupants of a detected craft.

Another object of the invention is to provide a relatively simple combination radio locating and signalling system whereby the transmitter of R. F. (radio frequency) pulse waves for obstacle detection purposes may be used simultaneously, and without interference to the obstacle detection function of the system, for transmission and reception of signals of intelligence.

The above and other objects ancillary thereto will become more apparent upon consideration of the following detailed description to be read in connection with the accompanying drawings, in which:

Fig. 2 is a graphical illustration useful for explaining the operating features of the signalling and obstacle detecting features of the invention;

Fig. 3 is a schematic diagram of a transmitter-receiver circuit according to the invention; and Fig. 4 is a graphical illustration useful for explaining the receiving operation of the systems of Figs. 1 and 3.

Figure 1:
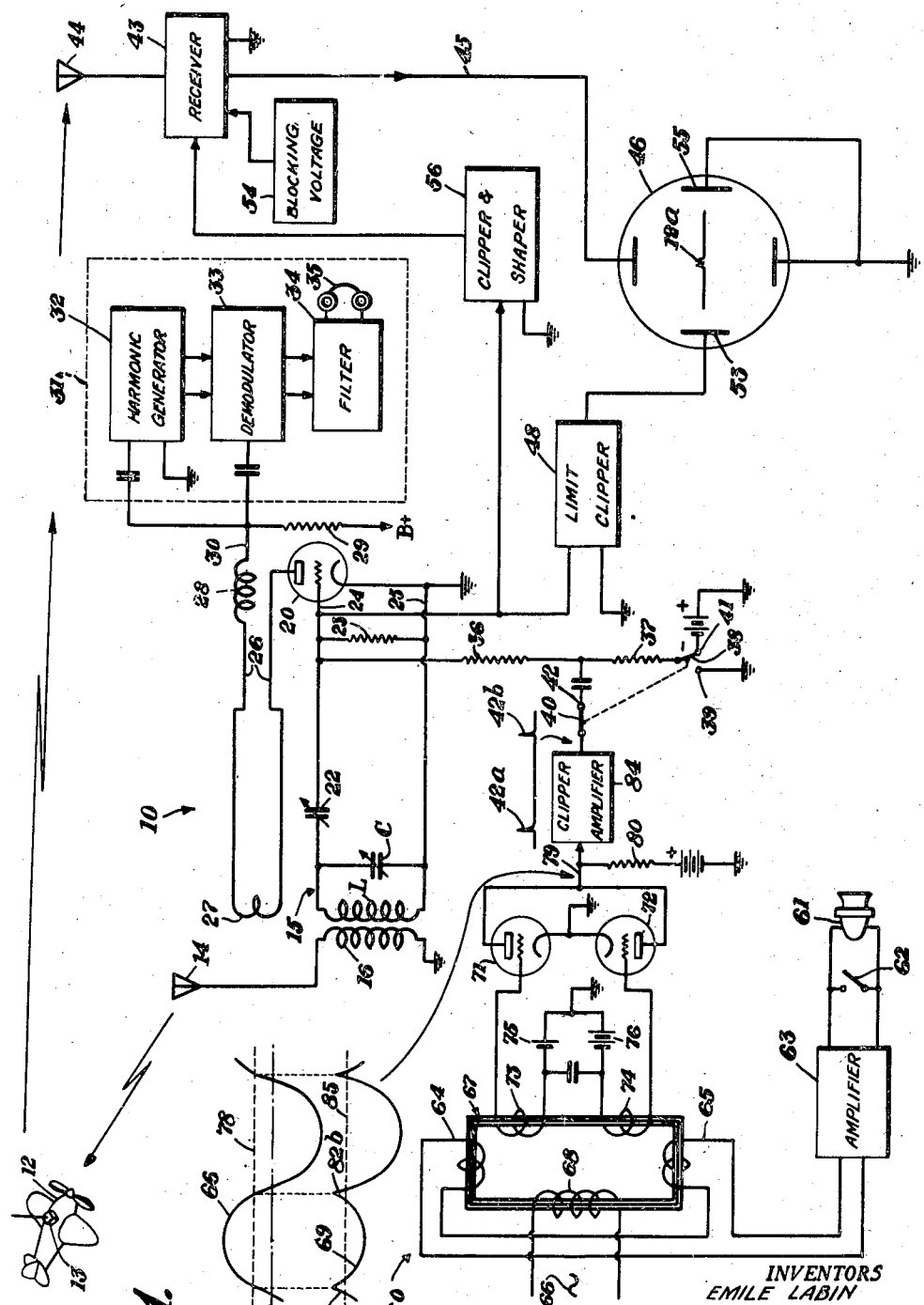
Fig. 1 is a schematic diagram of a combination radio locating and communicating system according to the principles of the invention.

Referring to Fig. 1 a combination radio locating and signalling system 10 is shown which may comprise a ground station or may be mounted on a vehicle or placed aboard an airplane or ship, as may be desired. In the illustration, the system 10 may be regarded as a ground station since it is shown detecting aircraft such as airplane 12. If the craft is friendly, it will be provided with a transmitter-receiver device 13, such as shown in Fig. 3, with which communication may be had from the system 10, although it will be understood that the transmitter-receiver or the receiver portion thereof may constitute another station. The system 10 will first be described with reference to the radio locating feature thereof and later with reference to the communicating feature thereof.

The system 10 includes an antenna 14 inductively coupled at 16 to a coil L of a radio frequency oscillator circuit 15 which includes a vacuum tube 20. The oscillator may be of any triggerable character which when triggered operates to produce a short period of radio frequency waves defining preferably a narrow width pulse for transmission purposes.

The form of oscillating circuit 15 chosen for purposes of illustrating the principles of this invention is of the positive feedback type. Coupled across the terminals of the coil L is the usual tuning condenser C by which the circuit is tunable over a selected band of radio and ultra high frequencies. The LC circuit is connected in the grid-to-cathode circuit of the tube 20 through a blocking condenser 22 which may be adjustable as indicated in the drawing. A grid leak 23 is connected between the grid connection 24 and the grounded cathode connection 25. The plate circuit 26 includes a feedback coil 27, a radio frequency choke 28 and a load resistor 29 connected to a positive source of plate current. The output connection 30 of the plate circuit 26 is connected to a demodulator unit 31 which includes a harmonic generator 32, a demodulator 33, a filter 34 and earphones 35, the details of which are hereinafter described in connection with Fig. 3.

The capacity of the condenser 22 and the resistance of the grid leak 23 are so selected as to provide the desired time constant which determines, in conjunction with the bias applied to the grid connection 24 over resistor 36, the cyclic blocking operation of the oscillator circuit. The resistor 36 is normally connected through a second resistor 37 and switch contacts 38, 39 to ground, whereby the grid connection 24 is provided with zero bias. During zero bias the oscillator 15 has a free running cyclic blocking operation according to the time constants of the values of the elements 22 and 23. The operation of the oscillator circuit when controlled by zero bias while satisfactory for obstacle detection is particularly sensitive for reception of messages. When controlled by a given negative bias at which the circuit is substantially insensitive for reception of messages and interference, the circuit is still satisfactory for obstacle detection and is particularly useful for transmission of intelligence. This latter condition is effected by changing the bias from zero or ground potential to a given negative bias, the pulsing operation of the oscillator being controlled by a train of impulses which may or may not be time modulated depending on whether or not it is desired to transmit intelligence.

As shown in Fig. 1 the switch contact 38 is ganged to switch contact 40 which when moved to the position shown places contact 38 in engagement with contact 41 for application of a given negative bias to the grid connection 24. The contact 40 is closed at the same time with contact 42 to provide a source of signal impulses 42a, 42b, etc., (curve a, Fig. 2) to control the triggering operation of the oscillator. Curve b of Fig. 2 represents the grid voltage wave 47 for the oscillator tube 20 indicating the triggering action of impulses 42a, 42b, etc. Curve c represents the pulse wave output of the oscillator circuit as transmitted over antenna 14 for obstacle detection and communication purposes. The pulse waves 52a, 52b, etc., of curve c, correspond in time position to the input impulses 42a, 42b, etc., but represent high power R. F. waves as compared to the low voltage of the input impulses.

It will be noted that the grid voltage of curve 47 follows generally the pattern of a saw-tooth wave wherein the slope of the rising portions 47a is determined by the time constant of the capacitance 22 and resistance 23 while the portions 47b represent the discharge of the capacitance 22 during which the circuit oscillates to produce radio or ultra high frequency oscillatory waves defining the pulse waves 52a, 52b, etc. The broken line 41a represents the triggering level produced by the negative bias at contact 41 at which the oscillator spills over and starts the oscillating period. As indicated by curve 47 and the pulse waves of curve c, the oscillator operates at spaced intervals to produce pulse waves at a timing dependent upon the occurrence of the signal impulses 42a, 42b, etc. In the absence of the signal impulses the build-up portion 47a of the curve may eventually trigger the oscillator, depending, of course, on the amount of bias at contact 41. For transmitting purposes it is preferable to provide sufficient negative bias to avoid self-triggering of the oscillator and, in fact, to render the oscillator insensitive to outside pulse sources. The signal impulses of the system, however, will be generated of sufficient amplitude to overcome the negative bias and thereby trigger the oscillator according to the time positions of the signal impulses.

The radio locating feature of the system 10 includes a radio receiver 43 having an antenna 44 and an output connection 45 applied across the vertical deflecting plates of a cathode ray oscillograph 46 to ground. The sweep circuit of the oscillograph 46 is provided with a sweep potential by limit clipper 48 which clips the wave 47 (curve b, Fig. 2) at limit level 49. This limit clipping operation produces a voltage wave 50 (curve d). The wave 50 includes a substantially linearly rising voltage 51 which serves to control the sweep of the cathode ray beam from left to right between horizontal deflecting plates 53 and 55. It will be understood, of course, that for each operating period of the oscillator circuit the cathode ray beam is caused to sweep across the screen of the oscillograph from left to right at a rate of speed corresponding to the time constants of the elements 22 and 23. It will be noted that the sweep portion 51 of the wave 50 follows directly the occurrence of the pulse waves 52a, 52b, etc., so that the detection of an echo pulse 12a (curve c, Fig. 2), such as might be caused by airplane 12, will produce a pulse deflection of the tracing as indicated by echo pulse 12a on the oscillograph 46. By suitably calibrating the screen of the oscillograph, either by markings or by calibration pulses, the distances to the airplane 12 may be determined.

In order to block the receiver during the transmission of the pulse waves 52a, 52b, etc., and to unblock the receiver so as to detect echo reflections caused by obstacles within the range of the system, a source of blocking voltage 54 is applied to the receiver 43 to maintain the receiver normally blocked. A timely unblocking voltage is obtained from the oscillator circuit by clipping and shaping a portion of the grid voltage wave 47. The clipping level may be the same as the level 49 or some other level. In fact, the same clipped voltage of the clipper 48 may be used by passing it through a suitable shaper. As shown, however, a separate clipper and shaper 56 is provided for this purpose. This provides a train of rectangular pulses 58 as indicated by curve e. It will be observed that the leading edges 58a of these pulses occur substantially in coincidence with the trailing edges of the pulses 52a, 52b, etc., while the trailing edges 58b coincide or extend beyond the inclined portions 51 of curve d. It will be understood, however, that the rectangular pulses may be extended further to any desired width so long as each occur at or directly following a transmitted pulse and overlaps a substantial portion of the sweep interval represented by the portion 51. The time interval required for the unblocking potential to overcome the blocked condition of the receiver insures that the receiver is unblocked only after transmission of each pulse wave.

From the foregoing, it will be clear that the transmission of recurring pulse waves, whether regular or displaced in time position, serve for detection of and determination of distance to obstacles. It will be understood, of course, that the antenna systems 14 and 44 may be directive in character and include direction finding equipment whereby the elevation and azimuth of the obstacles may also be determined. This additional equipment, however, has not been illustrated since the principles of the invention are concerned more particularly with the detection of craft and communication with other stations and the occupants of friendly craft for identification and other purposes.

For the purpose of communicating with receiver stations capable of detecting time modulated pulses such as the receiver equipment with which a friendly craft would be provided, the signal impulse source of the system shown in Fig. 1 includes, preferably, an impulse generating and modulating system 60 of the "cusper" type. Electrical current variations produced by speech or other intelligence at microphone 61 may be switched in by opening microphone switch 62 to amplifier 63 and applied to the input coils 64, 65 on transformer 67. An alternating current wave 66 is also applied to the transformer through primary winding 68. The alternating current wave 66 controls the average impulse repetition rate, the wave being rectified by a full-wave rectifier circuit including vacuum tubes 71 and 72 whereby a cusper wave 69 is produced. The secondary coils 73 and 74 are connected to the input grids of the tubes 71 and 72 and to voltage sources 75 and 76 which preferably differ a given amount so as to render the rectifying operation unbalanced by an amount indicated by the displaced axis 78. This offset bias condition of the rectifier circuit causes the cusps produced at the output connection 79 to be grouped in pairs as indicated by the cusps 82a and 82b. The voltage variations produced by speech at microphone 61 modifies the offset bias on the rectifier circuit causing the axis 78 to vary in displacement with respect to the zero axis 77, thereby displacing the cusps 82a and 82b toward or away from each other in push-pull manner depending upon the signal energy.

The output of the rectifier circuit is taken across the plate load 80 and may be applied to a clipper amplifier 84 for clipping at a level 85 to produce impulses 42a, 42b, etc., for application to the oscillator circuit 15. If desired, however, the cusps of wave 69 may be applied directly to the oscillator circuit since the circuit may be made responsive only to the cusps of the wave. For further understanding of the ramification of the impulse generator and modulator, reference may be had to the copending application of E. Labin and D. D. Grieg, Serial No. 455,897, filed August 24, 1942, now Patent No. 2,416,329 dated February 25, 1947.

It is thus clear that speech energy at microphone 61 is translated into time modulation of relatively low voltage impulses 42a, 42b, etc., which, in turn, determine the operating periods of the oscillator 15. The pulse waves produced by the oscillator provide the R. F. carrier for the intelligence and, at the same time, a sufficiently high powered pulse envelope for obstacle detection purposes.

Assuming that the craft 12 is flying within the range of the radio locating system 10, the pulse reflection thereof will be detected as indicated on the oscillograph by echo pulse 12a. The operator of the system will, in order to determine the identity of the craft, transmit a message or other signal by switching in the microphone 61. The operator's voice or other intelligence then time modulates signal impulses 42a, 42b, etc., which control the timing of the pulse waves 52a, 52b, etc. The high power pulse waves 52a, 52b, etc., operate to trigger the transmitter-receiver 13 whereby the plate pulse output of the oscillator thereof reproduces the time modulation of the detected pulse waves.

Comparing the circuits of Figs. 1 and 3, it will be observed that the two circuits are identical except that Fig. 1 includes the additional receiving and indicating circuits for radio locating purposes which are synchronized with the oscillator circuit from which the sweep and unblocking potentials are obtained. In Fig. 1 the details of the signal impulse generator and modulator circuit 60 is shown schematically while in Fig. 3 it is shown by block diagram. The demodulator unit 31 is shown in block diagram in Fig. 1 and in schematic form in Fig. 3.

Referring to Fig. 3, the demodulator unit 31 includes two input connections 91 and 92, connection 91 going to a coupling amplifier tube 94 and connection 92 to a demodulator tube 93 through amplifier 108. The output connection 95 of the tube 94 is applied to a resonant circuit 96 which is tuned to a desired harmonic. The pulses from the tube 94 shock excite the circuit 96 into resonance at the tuned harmonic which, preferably, is an odd harmonic of the average timing characteristic of the pulse waves triggering the oscillator 15.

A phase shifter circuit 98 having a coil 99 coupled with the inductance coil 97 receives the harmonic energy from the circuit 96 for application to screen grid 100 of the demodulator or mixer tube 93. The grid 100 is provided with a negative bias by connection 102 to the midtap of coil 99. The two ends of the coil 99 are connected to condenser 104 and resistor 105, respectively, the relative adjustment of which controls in known manner the phase of the harmonic wave. For further understanding of the ramifications of the above-described demodulating principles, reference may be had to the copending application of D. D. Grieg, Serial No. 459,959, filed September 28, 1942, now Patent No. 2,416,306, dated February 25, 1947.

In Fig. 4 curve $f$ represents the pulse waves received by the circuit of Fig. 3 from the system of Fig. 1. For reception the switches 38a and 40a are preferably moved to the positions shown in Fig. 3 whereby the oscillator 15 is provided with zero bias or at least less negative bias than the bias provided at contact 41. This decreased bias lowers the triggering level as shown by broken line 41b as compared with the triggering level 41a (see curves $b$ and $g$, Figs. 2 and 4, respectively). The pulse waves 52a, 52b, etc., of Fig. 4 are time displaced according to a linearly increasing signal input voltage, the broken line positions of the pulse waves indicating the normal timing of the pulse waves in the absence of a modulating signal. The grid voltage wave of curve $g$ indicates the triggering operation of the received pulse waves and curve $h$ represents the plate output pulse energy at connection 30. These output pulses 92a, 92b, etc., are applied through an amplifier 108 and thence to control grid 110 of the tube 93. The resulting grid potential produced in the tube 93 by the inputs on grid elements 100 and 110 is indicated by curve $i$. The wave 112 represents the odd harmonic applied to the grid element 100 and the pulse additions thereon represent the output pulses 92a, 92b, etc. The positions of the pulses on the curve 112 are determined by the degree of time modulation of the pulses. For zero modulation as represented by input pulse wave 52b, a given grid voltage condition is produced. The time displacement, either negatively or positively as determined by the input pulse waves, controls the position of the pulses on the slope of curve 112. Thus, for displacement due to a negative polarity of the input pulse wave 52a, the corresponding pulse 92a assumes a lower position than pulse 92b. For input pulse waves having a displacement of progressively greater positive polarity, such as pulse waves 52c, 52d, etc., the corresponding pulses 92c, 92d, etc., occur at progressively higher points on the curve 112.

The bias on the control grid 110 of the tube 93 is selected so as to provide a threshold clipping level 114 which clears the amplitude of the wave 112. Thus, the output of the tube 93 comprises a train of pulses 93a, 93b, etc., modulated in amplitude according to the time displacement of the corresponding input pulse waves. These pulses define an envelope 115 which corresponds to the signal energy at the transmitting station. By applying the amplitude modulated pulses of curve j to a suitable filter 120, the signal wave represented by envelope 115 is detectable on earphones 122.

In order to reply from the craft 12 to the radio locating system 10, the switches 38a and 40a are changed to the condition represented by the switch contacts 38 and 40 of Fig. 1. The transmitter-receiver circuit 13 is then conditioned for transmission similarly as hereinbefore described in connection with the transmitter circuit portion of Fig. 1. The operation is the same and need not be repeated. The system 10, however, will have the switch contacts 38 and 40 shifted to the positions indicated by contacts 38a and 40a of Fig. 3, whereby the system 10 will be sensitive to the pulse waves received from the circuit 13. While the system 10 is triggered by the pulse waves received from circuit 13, the obstacle detecting features of the system continue to operate and maintain detection of the craft 12 and of other craft that may be within range.

It will be readily apparent from the foregoing description that the triggering principle of the invention renders the circuit substantially free from interference and jamming. Interference pulses occurring during the low portion of the grid voltages as indicated by curves b and g will not trigger the circuits unless they are of exceptionally high power. Thus, for ordinary interfering pulses to trigger the circuit they must occur near or substantially in coincidence with the timing of the pulse waves. Further, since interfering pulses are usually at a repetition rate different from the repetition rate of a given train of pulse waves, they will not occur in substantial coincidence with the pulse waves except at widely spaced intervals thereby producing, in effect, a beat frequency interference. It will also be observed that by increasing the negative bias on the circuit during transmission, the increased bias reduces the sensitivity of the circuit to outside pulses thereby substantially eliminating all interference whether produced by jamming attempts or by another similar transmitter-receiver circuit.

It will also be clear that our system includes a new method and means for transmitting high power time modulated pulse waves of a given radio or ultra high frequency in response to voltage impulses of low power. This is of particular advantage over pulse wave transmitting systems heretofore proposed since no high power modulating signals are required, the modulation being effected in our system by simple synchronization of the triggering operation of the R. F. oscillator.

While we have described above the principles of our invention in connection with specific apparatus, it is to be clearly understood that this description is made only by way of example and not as a limitation on the scope of our invention as set forth in the objects of our invention and the accompanying claims.

We claim:

1. A combination radio locating and signalling system comprising an oscillator operable to transmit recurring pulse waves of a given timing characteristic, control means for controlling the pulsing rate of said oscillator, means to detect reflections of the pulse waves caused by the presence of a craft, means to generate a train of signal impulses time modulated according to intelligence, means to apply said signal impulses to said control means to synchronize the pulsing operation of said oscillator according to the timing of said signal impulses, whereby the time positioning of said pulse waves conveys said intelligence, demodulator means associated with the output of said oscillator, said demodulator means including means responsive to output pulses of the oscillator to generate a selected harmonic wave with respect to the given timing characteristic of said pulse waves, means to control the phase of said harmonic with respect to the timing of said output pulse waves, and clipper means to mix said output pulses with said harmonic wave, whereby the intelligence represented by the time positioning of the output pulses is detectable.

2. The system defined in claim 1 in combination with means to detect intelligence represented by time modulation of the pulsing periods of said oscillator in response to signal pulses of a timing characteristic capable of triggering said oscillator, means to selectively apply two different biasing potentials to said control means, one potential being applied during signal reception to render said oscillator sensitive to received pulse waves, and the other of said potentials being applied during transmission of intelligence to reduce the sensitivity of said oscillator to received pulse waves.

3. The system defined in claim 1 wherein said oscillator includes a control grid the voltage wave of which, at least in part, resembles a saw-tooth wave, one tooth for each pulsing operation of the oscillator; and the means for detecting reflections includes a cathode ray oscillograph, means for clipping the saw-tooth portion of said grid voltage wave, and means for applying the saw-tooth voltage thus obtained to said oscillograph as the sweep voltage thereof.

4. The system defined in claim 1 wherein said oscillator includes a control grid the voltage wave of which, at least in part, resembles a saw-tooth wave, one tooth for each pulsing operation of the oscillator; and the means for detecting reflections includes a radio receiver, means for normally blocking said receiver, means for clipping a portion of said grid voltage wave, and means for applying the voltage obtained by the clipping means to unblock said receiver for a desired portion of the cyclic operation of said oscillator.

5. A combination radio locating and communicating system comprising, at a given station transmitter means for transmitting a train of pulse waves of a given timing characteristic, means to detect echo pulses caused by reflection of said pulse waves by a craft, and means to time modulate the train of pulse waves with intelligence; at said craft, a pulsing device triggerable in response to said pulse waves, demodulator means responsive to the pulse output of said device for detecting the intelligence represented by the time modulation of the said pulse waves, means to produce a train of impulses time modulated with intelligence and means to trigger said pulsing device in synchronism with said impulses for transmission of signal waves to said station; and at said station, said transmitter means being triggerable in response to said signal waves, demodulator means responsive to the pulsing action of said transmitter means to detect the intelligence of the received signal waves, and means for operatively controlling said echo detecting means from said transmitter means triggered in response to said signal waves.

EMILE LABIN
DONALD D. GRIEG.
ARNOLD M. LEVINE.

REFERENCES CITED

The following references are of record in the file of this patent:

UNITED STATES PATENTS

| Number | Name | Date |
|---|---|---|
| 1,738,235 | Farrington | Dec. 3, 1929 |
| 2,064,958 | Taylor | Dec. 22, 1936 |
| 2,134,716 | Gunn | Nov. 1, 1938 |
| 2,189,549 | Hershberger | Feb. 6, 1940 |
| 2,227,598 | Lyman et al. | Jan. 7, 1941 |
| 2,252,083 | Luck | Aug. 12, 1941 |
| 2,262,838 | Deloraine et al. | Nov. 18, 1941 |
| 2,266,401 | Reeves | Dec. 16, 1941 |
| 2,308,639 | Beatty et al. | Jan. 19, 1943 |
| 2,407,199 | Wolff | Sept. 3, 1946 |
| 2,416,895 | Bartelink | Mar. 4, 1947 |